United States Patent
Onishi et al.

(10) Patent No.: US 6,817,340 B2
(45) Date of Patent: Nov. 16, 2004

(54) HIGH-PRESSURE FUEL SUPPLY SYSTEM

(75) Inventors: Yoshihiko Onishi, Tokyo (JP); Sigenobu Tochiyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/288,292

(22) Filed: Nov. 6, 2002

(65) Prior Publication Data

US 2003/0217735 A1 Nov. 27, 2003

(30) Foreign Application Priority Data

May 22, 2002 (JP) ........................................ 2002-147652

(51) Int. Cl.$^7$ .............................................. F02M 41/00
(52) U.S. Cl. ...................................... 123/458; 123/506
(58) Field of Search ................................ 123/458, 506, 123/511, 497, 499, 447, 446; 251/129.15, 129.01

(56) References Cited

U.S. PATENT DOCUMENTS

| | | | | |
|---|---|---|---|---|
| 4,522,372 A | * | 6/1985 | Yano et al. | 251/129.15 |
| 5,207,387 A | * | 5/1993 | Bergstrom | 239/585.4 |
| 5,328,100 A | * | 7/1994 | Bergstrom et al. | 239/585.4 |
| 5,984,259 A | * | 11/1999 | Najmolhoda et al. | 251/50 |

FOREIGN PATENT DOCUMENTS

| | | |
|---|---|---|
| JP | 05-157022 A | 6/1993 |
| JP | 10-169533 A | 6/1998 |
| JP | 11-287348 | 10/1999 |
| JP | 2001-248518 A | 9/2001 |
| JP | 2001-304073 A | 10/2001 |
| JP | 20011295719 | 10/2001 |

OTHER PUBLICATIONS

Japanese Office Action date Jun. 16, 2004.

* cited by examiner

Primary Examiner—Mahmoud Gimie
(74) Attorney, Agent, or Firm—Sughrue Mion, PLLC

(57) ABSTRACT

A high-pressure fuel supply system can reduce collision sounds generated when a plunger collides with a stopper. An electromagnetic valve includes a plunger, a valve seat with which the plunger is moved into and out of contact so that the valve seat is placed into communication with a pressurization chamber when the plunger is moved apart from the valve seat, a stopper for limiting the separation of the plunger from the valve seat, an armature made of a magnetic material and fixedly secured to the plunger, a core arranged in opposition to the armature, a solenoid wound around the core for attracting the armature toward the core through an electromagnetic force when energized, and a spring for urging the plunger toward the valve seat. A groove is formed near opposed surfaces of the armature and core for magnetically saturating a portion of a magnetic circuit generated by energizing the solenoid.

4 Claims, 8 Drawing Sheets

US 6,817,340 B2

HIGH-PRESSURE FUEL SUPPLY SYSTEM

BACKGROUND OF THE INVENTION

1. Field of the Invention

The present invention relates to a high-pressure fuel supply system used, for example, for a direct injection type internal combustion engine, and more particularly, it relates to a high-pressure fuel supply system including an electromagnetic valve arranged on a relief passage and controlled to be opened for a prescribed period on the discharge stroke of a fuel pump for controlling the amount of fuel discharged therefrom.

2. Description of the Related Art

FIG. 4 is a circuit diagram including a high-pressure fuel supply system 1.

This high-pressure fuel supply system 1 includes a low-pressure damper 3 arranged on a low-pressure fuel suction passage 2 for absorbing the pulsation of a low-pressure fuel, a high-pressure fuel pump 5 for pressurizing the low-pressure fuel from a low-pressure damper 3 to discharge it to a high-pressure fuel discharge passage 4, a relief passage 6 connecting between a suction side of the high-pressure fuel pump 5 and a pressurization chamber, and an electromagnetic valve 7 arranged on the relief passage 6 and being operated to open for adjusting the amount of fuel discharged from the high-pressure fuel pump 5. The high-pressure fuel pump 5 has a suction valve 8 and a discharge valve 9.

In the neighborhood of the high-pressure fuel supply system 1, there are provided a fuel tank 10, a low-pressure fuel pump 11 arranged in the fuel tank 10, a low-pressure regulator 12 arranged on the low-pressure fuel suction passage 2 for regulating the low-pressure fuel at a constant pressure, a relief valve 15 arranged on a drain pipe 14 branched from the high-pressure fuel discharge passage 4 at a branch portion 13, a delivery pipe 16 connected with the high-pressure fuel discharge passage 4, a fuel injection valves 17 connected with the delivery pipe 16, and a filter 18 connected with the low-pressure fuel pump 11.

FIG. 5 is a cross sectional view of the high-pressure fuel supply system 1 of FIG. 4.

The high-pressure fuel pump 5 of the high-pressure fuel supply system 1 includes a plate 21 having a fuel suction port 22 connected with the low-pressure fuel suction passage 2 and a fuel discharge port 23 connected with the high-pressure fuel discharge passage 4, a sleeve 24 of a cylindrical shape, a valve disc 25 having the suction valve 8 and arranged between an upper end face of the sleeve 24 and the plate 21, the discharge valve 9 arranged on the high-pressure fuel discharge passage 4, a piston 26 slidably received in the sleeve 24 to define a fuel pressurization chamber 27 in cooperation with the sleeve 24 for pressurizing the fuel that flows into the fuel pressurization chamber 27, and a spring 29 arranged under compression between a receiving portion 28 and a bracket 30 for urging the piston 26 in a direction to enlarge the volume of the fuel pressurization chamber 27.

In addition, the high-pressure fuel pump 5 includes a casing 31 having the low-pressure fuel suction passage 2 and the high-pressure fuel discharge passage 4, a housing 32 fixedly attached to the casing 31, and a tappet 33 slidably arranged at a tip end of the housing 32 and adapted to be placed into abutting engagement with a cam 35 fixedly secured to a camshaft 34 for causing the piston 26 to reciprocate in accordance with the profile of the cam 35.

FIG. 6 is an enlarged view of the electromagnetic valve 7 of FIG. 5. The electromagnetic valve 7 includes a plunger 40 having a fuel passage 40a formed therein along the axis thereof, a body 41 of a cylindrical shape that is fitted in the casing 31 and a housing 44 and slidably receives the plunger 40 of a cylindrical shape, a valve seat 42 arranged in pressure contact with an end of the plunger 40 and welded to the body 41, a stopper 43 fixedly mounted on the housing 44 for limiting the amount of lift of the plunger 40 upon opening thereof, a columnar armature 45 made of a magnetic material and welded to the plunger 40, a columnar core 46 arranged in opposition to the armature 45, a solenoid 47 wound around the core 46, a spring 48 arranged under compression inside the core 46 for urging the plunger 40 in a direction toward the valve seat 42 and a seal member 200 made of non-magnetic material which is austenitic stainless steel and welded to the housing 44 and the core 46.

Between the casing 31 and the housing 44 around the stopper 43, there is arranged an elastic O ring 49 for sealing fuel and absorbing collision sounds generated when the plunger 40 collides with the stopper 43.

With the high-pressure fuel supply system 1 as constructed above, the piston 26 is caused to reciprocate through the intermediary of the tappet 33 in accordance with the rotation of the cam 35 fixedly attached to the camshaft 34 of the engine.

When the piston 26 descends (on the fuel suction stroke), the volume of the fuel pressurization chamber 27 increases to reduce the pressure therein. As a result, the suction valve 8 is opened so that the fuel in the low-pressure fuel supply passage 2 flows into the fuel pressurization chamber 27 through the fuel suction port 22.

When the piston 26 ascends (on the fuel discharge stroke), the pressure in the fuel pressurization chamber 27 increases to open the discharge valve 9 so that the fuel in the fuel pressurization chamber 27 is supplied to the delivery pipe 16 through the fuel discharge port 23 and the high-pressure fuel discharge passage 4. Thereafter, the fuel is supplied to the fuel injection valves 17 which serve to inject the fuel to respective cylinders (not shown) of the engine.

In addition, when the solenoid 47 is energized, a closed magnetic circuit is formed by the core 46, the yoke 70, the housing 44 and the armature 45, as a result of which magnetic attraction is generated between the armature 45 and the core 46. In accordance with the magnetic attraction, the plunger 40 is caused to move away from the valve seat 42 against the resilient force of the spring 48, thus opening the electromagnetic valve 7. As a consequence, the relief passage 6 is placed in fluid communication with the fuel pressurization chamber 27 through the fuel passage 40a in the plunger 40 and the communication port 37 so that the pressure in the fuel pressurization chamber 27 is reduced to permit the discharge valve 9 to be closed, thereby stopping the supply of the high-pressure fuel to the fuel injection valves 17.

On the other hand, when the solenoid 47 is deenergized, the magnetic attraction between the armature 45 and the core 46 rapidly decreases. When the magnetic attraction decreases below the resilient force of the spring 48, the plunger 40 is caused to start moving in a direction toward the valve seat 42 under the action of the resilient force of the spring 48 so that it is placed in pressure contact with the valve seat 42. Consequently, the electromagnetic valve 7 is closed to shut off the relief passage 6.

FIG. 7 is a timing chart that shows the relation between the driving of the electromagnetic valve 7 and the suction and discharge strokes of the high-pressure fuel pump 5. In FIG. 7, an upper portion represents the amount of plunger lift; a black painted portion represents an area where fuel is discharged from the high-pressure fuel pump 5; and a lower portion represents the driving state of the electromagnetic valve 7. As can be seen from this figure, the amount of fuel discharged from the high-pressure fuel pump 5 on the fuel discharge stroke can be adjusted by controlling the driving time of the electromagnetic valve 7.

With the high-pressure fuel supply system 1 of the above configuration, the amount of lift of the plunger 40 is limited by the collision of the plunger 40 with the stopper 43 when the electromagnetic valve 7 is opened, and a collision sound is generated at that time (see point A in FIG. 7). Also, the plunger 40 collides with the valve seat 42 under the action of the resilient force of the spring 48 upon closure of the electromagnetic valve 7, and a collision sound is generated at that time (see point B in FIG. 7).

Thus, collision sounds are generated upon opening and closing of the electromagnetic valve 7. In this connection, (g) in FIG. 8 represents, among the magnetic attraction acting between the armature 45 and the core 46, a basic load value required to ensure sealing under the pressure in the fuel pressurization chamber 27 upon opening of the electromagnetic valve 7, and (f) in FIG. 8 represents a portion of load beyond the basic load value, which acts on the electromagnetic valve 7 upon opening thereof.

On the other hand, upon closure of the electromagnetic valve 7, the resilient force of the spring 48 acts totally as a load on the electromagnetic valve 7, so that the plunger 40 is caused to collide with the valve seat 42 under the full resilient force.

Regarding the collision sound generated upon opening of the electromagnetic valve 7, there is a problem that the collision sound grows larger as the value of the load (f) in FIG. 8 increases.

In addition, in case where the working pressure of fuel is changed, it is necessary to change the load of the spring 48 required to ensure sufficient sealing performance under the pressure in the fuel pressurization chamber 27. In this case, for example, when the diameter of the armature 45 is changed to alter the area of its surface facing the core 46 in order to change the amount of magnetic attractive force acting between the armature 45 and the core 46, it becomes necessary to change the size of the inside diameter of the housing 44. Moreover, there is also another problem that the slope of the magnetic attractive force (generated load) with respect to the current is changed.

SUMMARY OF THE INVENTION

The present invention is intended to obviate the problems as referred to above, and has for its object to provide a high-pressure fuel supply system which is capable of achieving reduction in collision sounds with a simple construction without changing the response characteristic of an electromagnetic valve to any practical extent.

Bearing the above object in mind, the present invention resides in a high-pressure fuel supply system which includes: a low-pressure fuel suction passage connected with a fuel tank; a high-pressure fuel discharge passage connected with a delivery pipe which is in turn connected with a fuel injection valve; a fuel pump arranged between the low-pressure fuel suction passage and the high-pressure fuel discharge passage and being operable, during reciprocation of a piston in a sleeve, to open a suction valve to suck fuel from the low-pressure fuel suction passage into a fuel pressurization chamber on a suction stroke and to open a discharge valve to discharge the fuel in the fuel pressurization chamber to the high-pressure fuel discharge passage on a discharge stroke; a relief passage connecting between the fuel pump and the low-pressure fuel suction passage; and an electromagnetic valve arranged on the relief passage and adapted to be opened to control an amount of fuel discharged from the fuel pump on a discharge stroke. The electromagnetic valve includes: a plunger; a valve seat with which the plunger is caused to move into and out of contact so that the valve seat is placed into fluid communication with the fuel pressurization chamber when the plunger is moved apart from the valve seat; a stopper for limiting the distance of separation of the plunger from the valve seat; an armature made of a magnetic material and fixedly secured to the plunger; a core arranged in an opposed relation with the armature; a solenoid wound around the core for attracting the armature toward the core through an electromagnetic force when energized; and a spring for urging the plunger in a direction toward or away from the valve seat. A groove is formed in the vicinity of opposed surfaces of the armature and the core for magnetically saturating a portion of a magnetic circuit generated by energizing the solenoid. According to the above arrangement, collision sounds can be reduced with a simple construction without affecting the opening and closing response of the electromagnetic valve to any practical extent.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings, with the same or corresponding parts or members thereof as the above-mentioned known ones being identified by the same symbols.

Embodiment 1.

Figure 1:
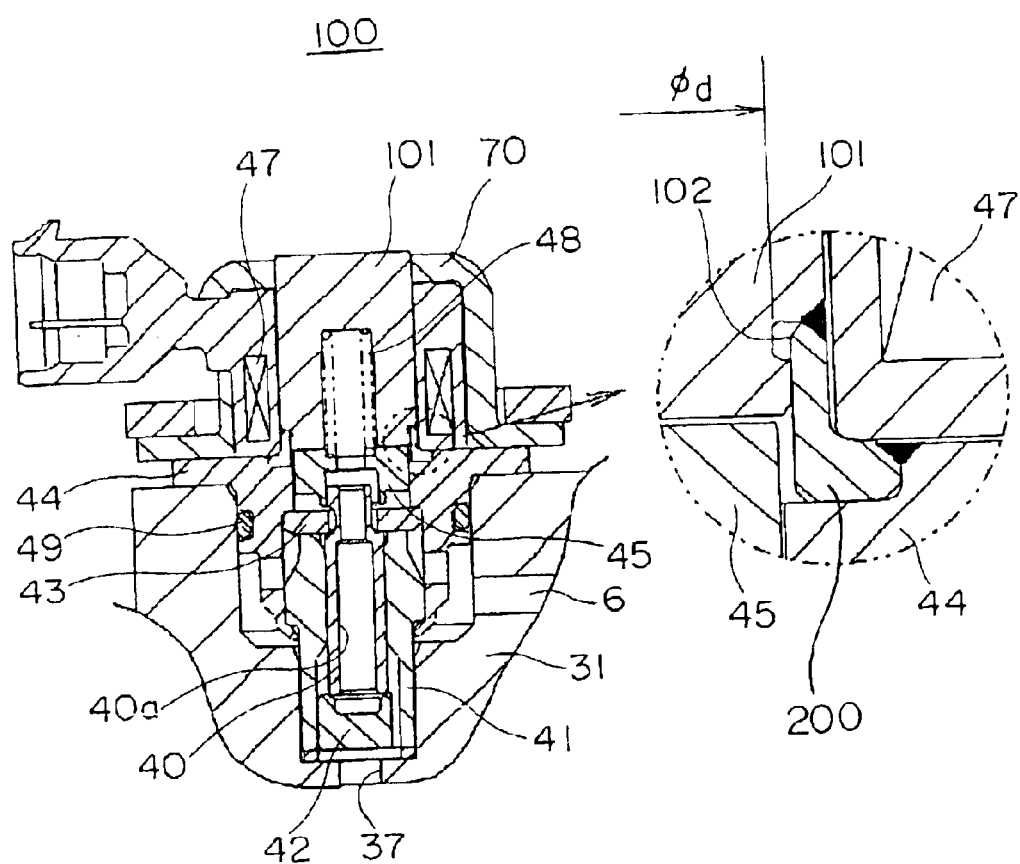
FIG. 1 is a cross sectional view of an electromagnetic valve of a high-pressure fuel supply system according to a first embodiment of the present invention.

FIG. 1 is a cross sectional view of an electromagnetic valve 100 of a high-pressure fuel supply system according to a first embodiment of the present invention. This electromagnetic valve 100 includes a plunger 40 having a fuel passage 40a formed therein along the axis thereof, a body 41 which is fitted in a casing 31 and a housing 44 and in which the plunger 40 is slidably received, a valve seat 42 arranged in pressure contact with an end of the plunger 40 and welded to the body 41, a stopper 43 fixedly mounted on the housing 44 for limiting the amount of lift of the plunger 40 upon opening thereof, an O ring 49 arranged around the stopper 43, an armature 45 made of a magnetic material and welded to the plunger 40, a core 101 arranged in an opposed relation to the armature 45, a solenoid 47 wound around the core 101, a spring 48 arranged under compression inside the core 101 for urging the plunger 40 in a direction toward the valve seat 42 and a seal member 200 made of non-magnetic material which is austenitic stainless steel and welded to the housing 44 and the core 101.

Figure 2:
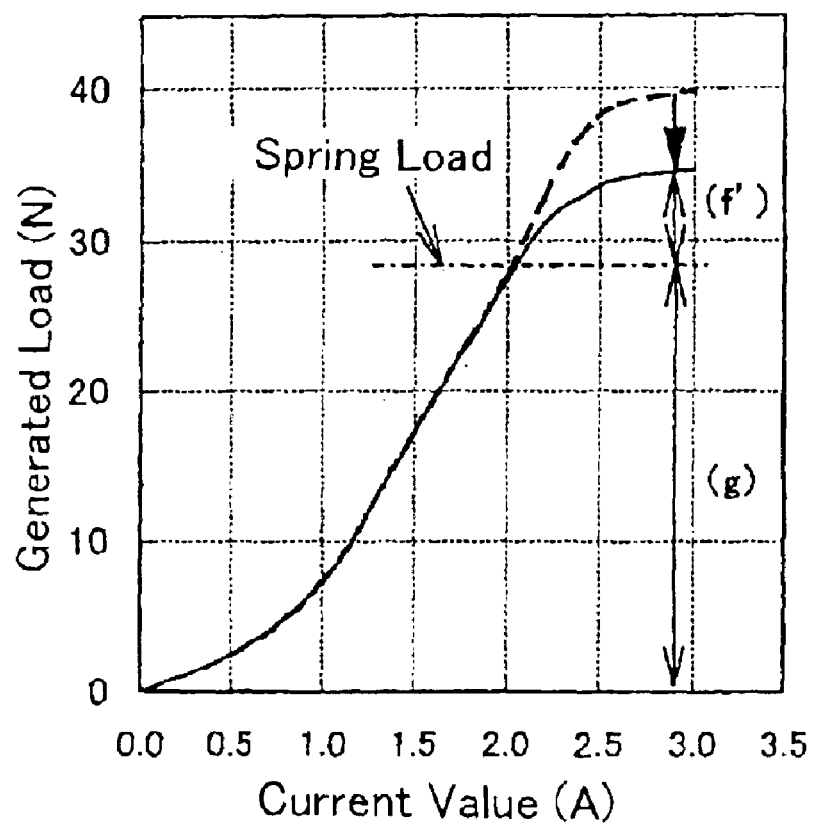
FIG. 2 is a magnetic attraction characteristic view showing the relation between the value of current supplied to the electromagnetic valve of FIG. 1 and the load generated.
Figure 4:
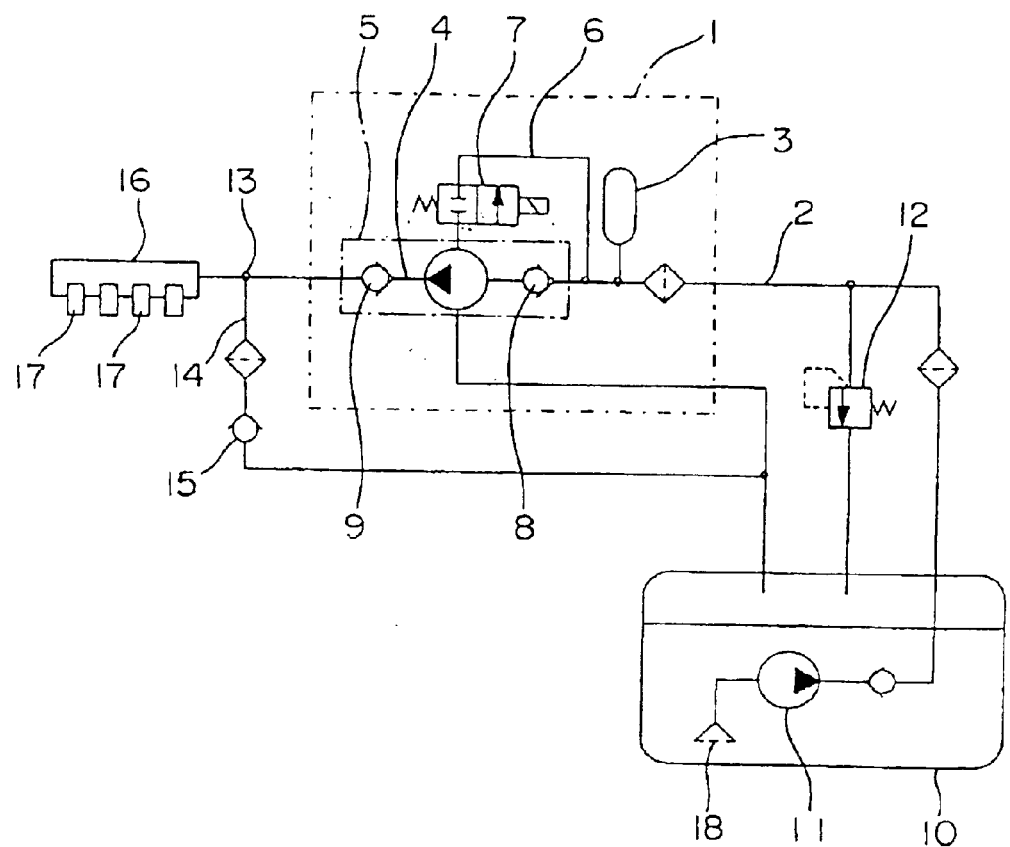
FIG. 4 is a circuit diagram of a known high-pressure fuel supply system.
Figure 5:
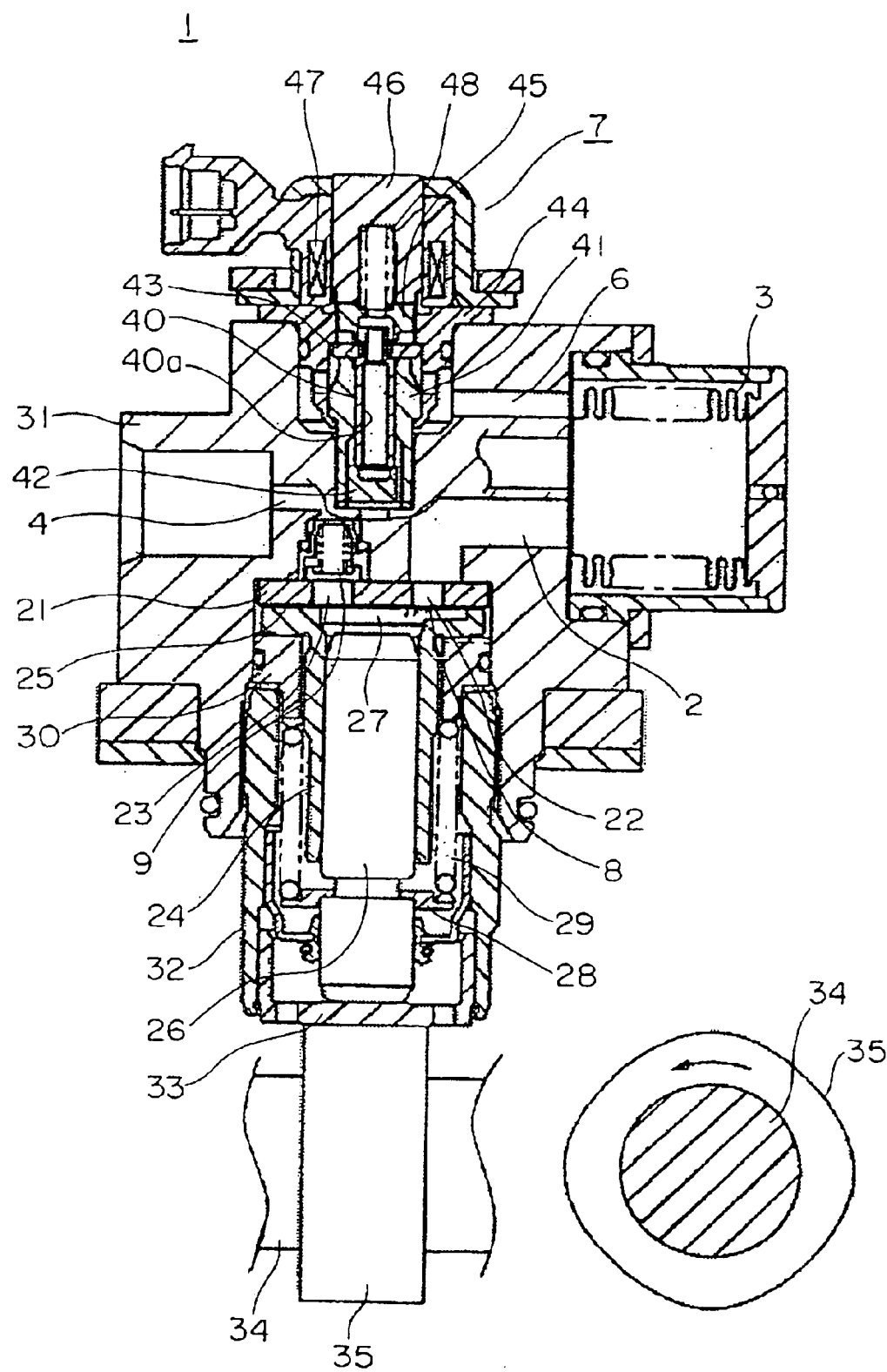
FIG. 5 is a cross sectional view of the known high-pressure fuel supply system of FIG. 4.
Figure 6:
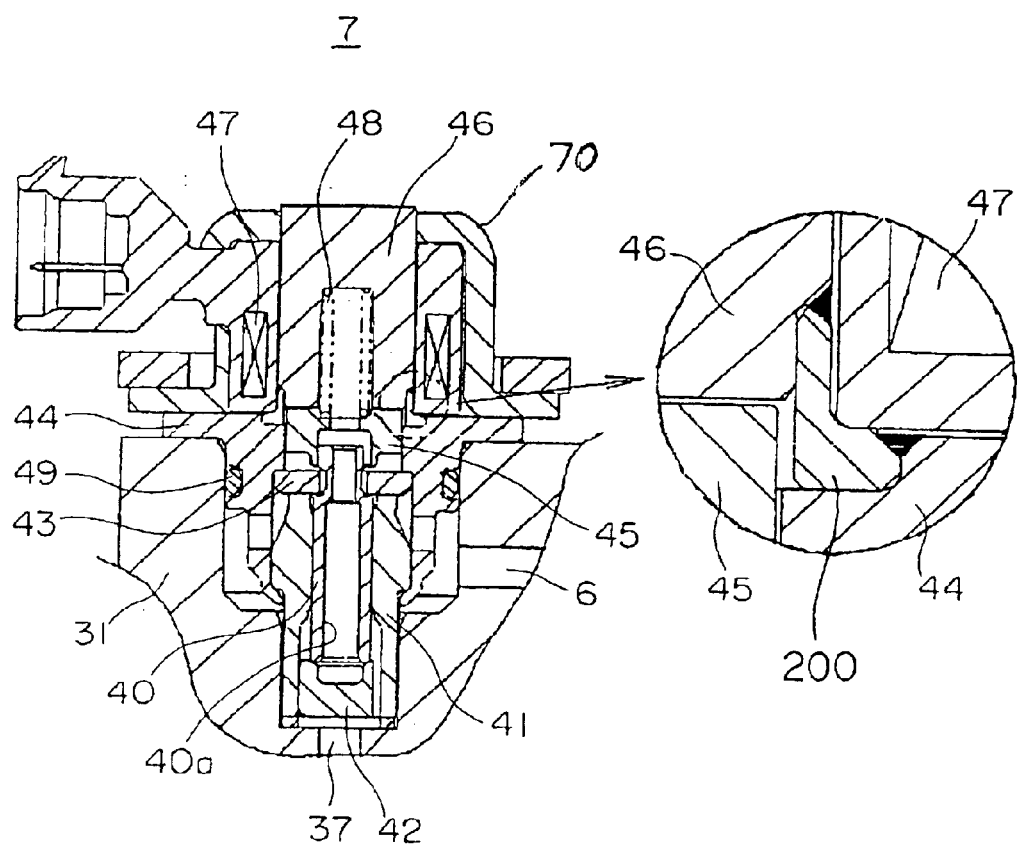
FIG. 6 is a cross sectional view of an electromagnetic valve shown in FIG. 5.
Figure 7:
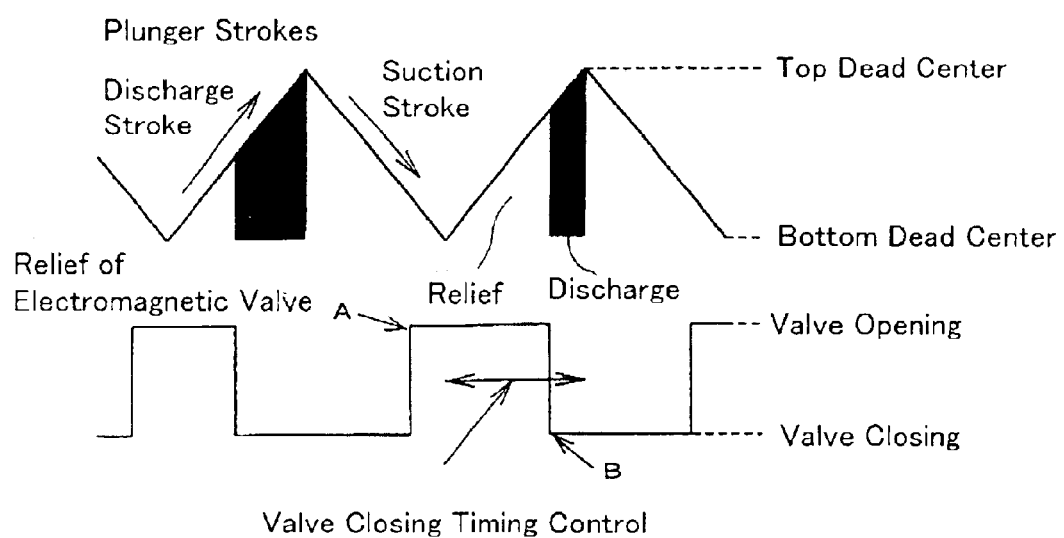
FIG. 7 is a timing chart showing the relation between the driving of the electromagnetic valve and the suction and discharge strokes of a high-pressure fuel pump of the known high-pressure fuel supply system of FIG. 4.
Figure 8:
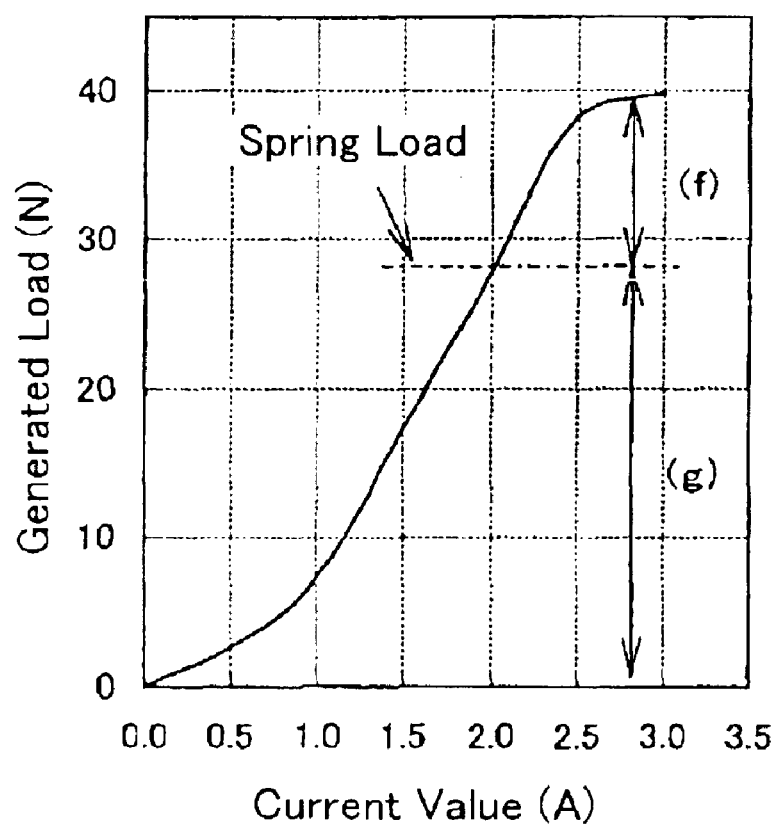
FIG. 8 is a magnetic attraction characteristic view showing the relation between the value of current supplied to the electromagnetic valve of FIG. 5 and the load generated.

A circumferentially extending groove 102 is formed on the outer peripheral surface of the core 101 which is apart 2–4 mm from the attraction surface of the core 101 magnetically drawing or attracting the armature 45. The size of the groove 102 is adjusted in such a manner that magnetic saturation is generated in the groove 102 so as to suppress an increase in the magnetic attraction force of the core 101 due to the increased current supplied to the solenoid 47, nearly at a point when the magnetic attraction force generated exceeds a prescribed load required to ensure sealing under the pressure in a fuel pressurization chamber 27 (see FIG. 5). FIG. 2 is a magnetic attraction characteristic view (i.e., electromagnetic force characteristic view) showing the relation between the current value and the magnetic attraction force (i.e., generated load). In this figure, f' represents a load upon opening of the electromagnetic valve 100 at which the plunger 40 comes into abutting engagement with the stopper 43, With the electromagnetic valve 100 in the high-pressure fuel supply system, when the solenoid 47 is energized, a closed magnetic circuit is formed by the core 101, a yoke 70, the housing 44 and the armature 45, whereby a magnetic attraction force is generated between the armature 45 and the core 101 to cause the plunger 40 to move away from the valve seat 42 against the resilient force of the spring 48, thereby closing the electromagnetic valve 100. As a result, a relief passage 6 (see FIG. 4) connecting between a suction side of a high-pressure fuel pump 5 (FIG. 4) and the fuel pressurization chamber 27 (FIG. 5) is placed in fluid communication with the fuel pressurization chamber 27 through the fuel passage 40a in the plunger 40 and a communication port 37, so that the pressure in the fuel pressurization chamber 27 is reduced to permit the discharge valve 9 to be closed, thereby stopping the supply of the high-pressure fuel to a fuel injection valves 17 (FIG. 4).

On the other hand, when the solenoid 47 is deenergized, the magnetic attraction between the armature 45 and the core 101 becomes zero so that the plunger 40 is placed in pressure contact with the valve seat 42 under the action of the resilient force of the spring 48, thereby closing the electromagnetic valve 100 and hence the relief passage 6.

With the electromagnetic valve of this high-pressure fuel supply system, when the electromagnetic valve 100 is opened, the plunger 40 is lifted to collide with the stopper 43, thus generating a collision sound. However, there is generated magnetic saturation in the groove 102 formed in the core 101, and hence the value of the above-mentioned load f becomes smaller as compared with that of the aforementioned known high-pressure fuel supply system. Accordingly, the collision sound at this time is reduced in its magnitude.

In addition, as can be seen from the magnetic attraction characteristic view of FIG. 2, the relation between the current value and the generated load is constant irrespective of the presence or absence of the groove 102 until the plunger 40 collides with the stopper 43 (i.e., in a range (g) in FIG. 2). Accordingly, the opening and closing response of the electromagnetic valve 100 is not affected to any practical extent. As a result, there is substantially no or little influence of the operation of the electromagnetic valve 100 on the amount of fuel discharged from the high-pressure fuel pump 5.

In particular, it has been found from experiments that when the position of the groove 102 is in the range of 2–4 mm apart from the attraction surface of the core 101 which is an opposed surface facing the armature 45, the relation between the current value and the generated load in the above-mentioned range (g) in FIG. 2 is constant irrespective of the presence or absence of the groove 102.

Embodiment 2.

Figure 3:
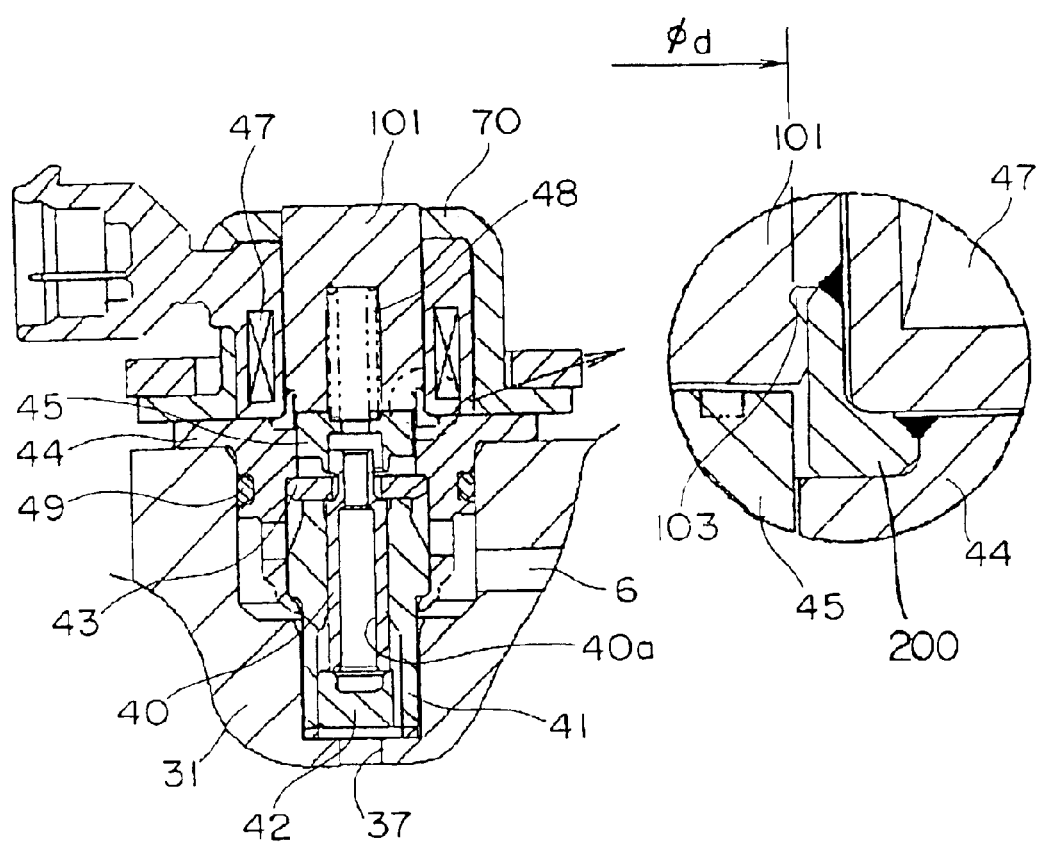
FIG. 3 is a cross sectional view of an electromagnetic valve of a high-pressure fuel supply system according to a second embodiment of the present invention.

FIG. 3 is a cross sectional view of an electromagnetic valve 100 of a high-pressure fuel supply system according to a second embodiment of the present invention. With this electromagnetic valve 100, the shape of a groove 103 formed in a core 101 is different from the shape of the groove 102 of the first embodiment.

The construction of this embodiment other than the above is similar to that of the high-pressure fuel supply system of the first embodiment.

In contrast to the first embodiment in which the shape of the groove 102 is rectangular, the groove 103 of this second embodiment takes the shape of a substantially triangular configuration. The values of magnetic saturation in the grooves 102, 103, respectively, are decided by the innermost diameters ø d of these grooves. Accordingly, when a comparison is made between the groove 102 and the groove 103, the groove 102 is better than the groove 103 from the point of view of dimensional control, but the groove 103 is better than the groove 102 from the standpoint of workability or machinability.

Although in the above-mentioned embodiments, the grooves 102, 103 are formed in the core 101, they may be formed in the armature 45 along the chain double-dashed line in FIG. 3 for example. In addition, the grooves may be formed to extend between the core and the armature on their side surfaces along their circumferential direction.

Moreover, with the electromagnetic valve 100 according to the first or second embodiment, the plunger 40 is urged into pressure contact with the valve seat 42 by the resilient force of the spring 48 when the electromagnetic valve 100 is closed, whereas the armature 45 is magnetically attracted or drawn to the core 46 by energizing the solenoid 47 when the electromagnetic valve 100 is opened. However, the present invention is of course applicable to such an electromagnetic valve in which upon opening of the electromagnetic valve, an end of the plunger is urged to separate from the valve seat in a direction away from the spring under the action of the resilient force thereof, whereas upon closure of the electromagnetic valve, the armature is magnetically attracted or drawn from the core by energizing the solenoid so that the end of the plunger is forced to collide with the valve seat.

As described in the foregoing, according to the present invention, there is provided a high-pressure fuel supply system including: a low-pressure fuel suction passage connected with a fuel tank; a high-pressure fuel discharge passage connected with a delivery pipe which is in turn connected with a fuel injection valve; a fuel pump arranged between the low-pressure fuel suction passage and the high-pressure fuel discharge passage and being operable, during reciprocation of a piston in a sleeve, to open a suction valve to suck fuel from the low-pressure fuel suction passage into a fuel pressurization chamber on a suction stroke and to open a discharge valve to discharge the fuel in the fuel pressurization chamber to the high-pressure fuel discharge passage on a discharge stroke; a relief passage connecting between the fuel pump and the low-pressure fuel suction passage; and an electromagnetic valve arranged on the relief passage and adapted to be opened to control an amount of fuel discharged from the fuel pump on a discharge stroke. The electromagnetic valve includes: a plunger; a valve seat with which the plunger is caused to move into and out of contact so that the valve seat is placed into fluid communication with the fuel pressurization chamber when the plunger is moved apart from the valve seat; a stopper for limiting the distance of separation of the plunger from the valve seat; an armature made of a magnetic material and fixedly secured to the plunger; a core arranged in an opposed relation with the armature; a solenoid wound around the core for attracting the armature toward the core through an electromagnetic force when energized; and a spring for urging the plunger in a direction toward or away from the valve seat. A groove is formed in the vicinity of opposed surfaces of the armature and the core for magnetically saturating a portion of a magnetic circuit generated by energizing the solenoid. With this arrangement, it is possible to reduce collision sounds with a simple construction without affecting the opening and closing response of the electromagnetic valve to any practical extent.

Preferably, the groove may be formed in the core, so that collision sounds can be easily reduced while exerting substantially no or little influence on the opening and closing response of the electromagnetic valve.

Preferably, the groove may be formed in the armature, so that collision sounds can be easily reduced while exerting substantially no or little influence on the opening and closing response of the electromagnetic valve.

Preferably, the groove may be formed apart 2–4 mm from an attraction surface at least one of the core and the armature, so that it is possible to reduce collision sounds in a more reliable manner while exerting substantially no or little influence on the opening and closing response of the electromagnetic valve.

While the invention has been described in terms of preferred embodiments, those skilled in the art will recognize that the invention can be practiced with modifications within the spirit and scope of the appended claims.

What is claimed is:

1. A high-pressure fuel supply system comprising:
    a low-pressure fuel suction passage connected with a fuel tank;
    a high-pressure fuel discharge passage connected with a delivery pipe which is in turn connected with a fuel injection valve;
    a fuel pump arranged between said low-pressure fuel suction passage and said high-pressure fuel discharge passage and being operable, during reciprocation of a piston in a sleeve, to open a suction valve to suck fuel from said low-pressure fuel suction passage into a fuel pressurization chamber on a suction stroke and to open a discharge valve to discharge the fuel in said fuel pressurization chamber to said high-pressure fuel discharge passage on a discharge stroke;
    a relief passage connecting between said fuel pump and said low-pressure fuel suction passage; and
    an electromagnetic valve arranged on said relief passage and adapted to be opened to control an amount of fuel discharged from said fuel pump on a discharge stroke;
    said electromagnetic valve comprising: a plunger; a valve seat with which said plunger is caused to move into and out of contact so that said valve seat is placed into fluid communication with said fuel pressurization chamber when said plunger is moved apart from said valve seat; a stopper for limiting the distance of separation of said plunger from said valve seat; an armature made of a magnetic material and fixedly secured to said plunger; a core arranged in an opposed relation with said armature; a solenoid wound around said core for attracting said armature toward said core through an electromagnetic force when energized; and a spring for urging said plunger in a direction toward or away from said valve seat;
    wherein a groove is formed in the vicinity of opposed surfaces of said armature and said core for magnetically saturating a portion of a magnetic circuit generated by energizing said solenoids,
    wherein said groove is substantially triangular in shape.

2. The high-pressure fuel supply system according to claim 1, wherein said groove is formed in said core.

3. The high-pressure fuel supply system according to claim 1, wherein said groove is formed in said armature.

4. A high-pressure fuel supply system comprising:
    a low-pressure fuel suction passage connected with a fuel tank;
    a high-pressure fuel discharge passage connected with a delivery pipe which is in turn connected with a fuel injection valve;
    a fuel pump arranged between said low-pressure fuel suction passage and said high-pressure fuel discharge passage and being operable, during reciprocation of a piston in a sleeve, to open a suction valve to suck fuel from said low-pressure fuel suction passage into a fuel pressurization chamber on a suction stroke and to open a discharge valve to discharge the fuel in said fuel pressurization chamber to said high-pressure fuel discharge passage on a discharge stroke;
    a relief passage connecting between said fuel pump and said low-pressure fuel suction passage; and
    an electromagnetic valve arranged on said relief passage and adapted to be opened to control an amount of fuel discharged from said fuel pump on a discharge stroke;
    said electromagnetic valve comprising: a plunger; a valve seat with which said plunger is caused to move into and out of contact so that said valve seat is placed into fluid communication with said fuel pressurization chamber when said plunger is moved apart from said valve seat; a stopper for limiting the distance of separation of said plunger from said valve seat; an armature made of a magnetic material and fixedly secured to said plunger; a core arranged in an opposed relation with said armature; a solenoid wound around said core for attracting said armature toward said core through an electromagnetic force when energized; and a spring for urging said plunger in a direction toward or away from said valve seat;
    wherein a groove is formed in the vicinity of opposed surfaces of said armature and said core for magnetically saturating a portion of a magnetic circuit generated by energizing said solenoid,
    wherein said groove is formed apart 2–4 mm from an attraction surface of at least one of said core and said armature.

* * * * *